(12) United States Patent
Chen et al.

(10) Patent No.: US 8,149,502 B2
(45) Date of Patent: Apr. 3, 2012

(54) CLADDING-PUMPED EVANESCENT GAIN OPTICAL FIBER

(75) Inventors: Nan-Kuang Chen, Miaoli (TW);
Yinchieh Lai, Hsinchu (TW);
Jing-Shyang Horng, Miaoli (TW);
Hsi-Wen Yang, Miaoli (TW)

(73) Assignee: National United University, Miaoli (TW)

( * ) Notice: Subject to any disclaimer, the term of this patent is extended or adjusted under 35 U.S.C. 154(b) by 335 days.

(21) Appl. No.: 12/465,167

(22) Filed: May 13, 2009

(65) Prior Publication Data
US 2010/0220386 A1    Sep. 2, 2010

(51) Int. Cl.
*H01S 3/00* (2006.01)

(52) U.S. Cl. .................... 359/341.1; 385/123

(58) Field of Classification Search ........... 385/123; 359/341.1
See application file for complete search history.

(56) References Cited

U.S. PATENT DOCUMENTS

| | | | | |
|---|---|---|---|---|
| 5,877,890 | A * | 3/1999 | Snitzer | 359/337.5 |
| 6,288,835 | B1 * | 9/2001 | Nilsson et al. | 359/341.3 |
| 6,445,494 | B1 * | 9/2002 | Nilsson et al. | 359/341.1 |
| 6,483,974 | B1 * | 11/2002 | Waarts | 385/123 |
| 7,184,206 | B2 * | 2/2007 | Chen et al. | 359/341.1 |
| 7,215,858 | B2 * | 5/2007 | Po | 385/123 |
| 7,437,041 | B2 * | 10/2008 | Po | 385/123 |
| 2002/0030881 | A1 * | 3/2002 | Nilsson et al. | 359/341.1 |

* cited by examiner

*Primary Examiner* — Mark Hellner
(74) *Attorney, Agent, or Firm* — Volpe and Koenig, P.C.

(57) ABSTRACT

A cladding-pumped gain optical fiber is provided. The cladding-pumped gain optical fiber includes a core transmitting a signal light; a first cladding covering the core and having an optical-gain dopant; a second cladding covering the first cladding for transmitting a pumping light; and a third cladding covering the second cladding for reflecting the pumping light.

30 Claims, 4 Drawing Sheets

CLADDING-PUMPED EVANESCENT GAIN OPTICAL FIBER

FIELD OF THE INVENTION

The present invention relates to an evanescent gain optical fiber, and more particularly to a gain optical fiber which is used for the signal light gain and can be cooperated with the cladding-pumped laser light.

BACKGROUND OF THE INVENTION

The optical amplifier is an essential device for the optical fiber communication system, which amplifies the intensity of the signal light transmitted within the optical fiber after it is naturally declined to keep it on a certain standard.

In consideration of the cost, the erbium-doped optical fiber amplifier is the worthiest in the market. The operation of the erbium-doped optical fiber amplifier is to firstly excite the electron in the 4f shell of the erbium ion doped in the optical fiber to an excitation state by a pump laser light. When the signal light passes through the erbium-doped optical fiber, the electron in the excitation state is stimulated by an incident photon to give laser emission having the same wavelength, polarization, as well as phase with that of the incident photon. This results in the optical gain or the amplifying effect.

However, the conventional erbium-doped optical fiber amplifier based on evanescent excitation method has a limited optical gain or amplifying effect due to the limited effective operation length. Please refer to FIG. 1, which shows the conventional method where the slant grating is used to reflect the pumping light in the optical fiber to the side having the optical-gain medium so as to generate the optical gain. Besides, the side-polishing can also be used to expose signal light and pumping light in the optical fiber to the side having the optical-gain medium. No matter which method is used, the effective interaction length between the gain medium and signal/pump lights is limited. This relatively limits the optical gain or the amplifying effect.

In order to overcome the drawbacks in the prior art, a cladding-pumped evanescent gain optical fiber is provided. The particular design in the present invention not only solves the problems described above, but also is easy to be implemented. Thus, the present invention has the utility for the industry.

SUMMARY OF THE INVENTION

In accordance with one aspect of the present invention, a gain optical fiber which is used for the single-mode signal light gain and can be cooperated with the cladding-pumped laser light is provided. Through the design of the optical fiber structure and the configuration of materials, the effective interaction length between gain medium and signal/pump lights is unlimited and the noise is low since the spontaneous emission can not be guided to raise the noise flow.

In accordance with another aspect of the present invention, a cladding-pumped gain optical fiber is provided. The cladding-pumped gain optical fiber comprises a core transmitting a signal light; a first cladding covering the core and having an optical-gain dopant; a second cladding covering the first cladding for transmitting a pumping light; and a third cladding covering the second cladding for reflecting the pumping light.

Preferably, the first cladding has a refractive index larger than that of the second cladding, and the second cladding has a refractive index larger than that of the third cladding.

Preferably, the pumping light is a multimode laser light.

Preferably, the first cladding has a thickness approximate to a wavelength of the signal light.

Preferably, the cladding-pumped evanescent gain optical fiber has a coiled structure.

Preferably, the optical-gain dopant includes a rare earth element.

Preferably, the rare earth element is one selected from a group consisting of Er, Yb and Tm.

Preferably, the optical-gain dopant includes a transition element.

Preferably, the transition element is one of Cr and Mn.

Preferably, the optical-gain dopant includes an optical non-linear material.

Preferably, the optical non-linear material includes one of Ge and Pb.

Preferably, the second cladding and the third cladding have an interface there between, which has a non-circular shape.

Preferably, the cladding-pumped evanescent gain optical fiber further includes a fourth cladding disposed between the core and the first cladding, wherein the fourth cladding has a dispersive dopant and a refractive index smaller than that of the core.

Preferably, the dispersive dopant includes one of fluorine and boron.

Preferably, the fourth cladding has a thickness approximate to a wavelength of the signal light.

In accordance with a further aspect of the present invention, an optical-gain optical fiber is provided. The optical-gain optical fiber includes a core transmitting a signal light; a first cladding covering the core, and having an optical-gain dopant for generating optical gains; and a second cladding covering the first cladding for reflecting the optical gains.

Preferably, the first cladding has a refractive index larger than that of the core, and the core has a refractive index larger than that of the second cladding.

Preferably, the first cladding has a thickness approximate to a wavelength of the signal light.

Preferably, the optical-gain optical fiber is used in a coiled structure.

Preferably, the optical-gain dopant includes a rare earth element.

Preferably, the rare earth element is one selected from a group consisting of Er, Yb and Tm.

Preferably, the optical-gain dopant includes a transition element.

Preferably, the transition element is one of Cr and Mn.

Preferably, the optical-gain dopant includes an optical non-linear material.

Preferably, the optical non-linear material includes one of Ge and Pb.

Preferably, the signal light is a single-mode laser light.

Preferably, the optical-gain optical fiber further includes a third cladding disposed between the core and the first cladding, wherein the third cladding has a dispersive dopant and a refractive index smaller than that of the core.

Preferably, the dispersive dopant includes one of fluorine and boron.

Preferably, the third cladding has a thickness approximate to a wavelength of the signal light.

Preferably, a part of the optical-gain dopant is in an excitation state.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The basic principle of the optical fiber to transmit light is to use the total internal reflection principle of light. That is to say, when the light passing in a medium having a higher refractive index is about to enter another medium having a lower refractive index, the total internal reflection will occur within a certain incident angle range. In other words, the total internal reflection will only occur when the light is transmitted from the medium having a higher refractive index to the medium having a lower refractive index. On the contrary, it is inevitable that a part of the light will be transmitted from the medium having a lower refractive index to the medium having a higher refractive index. Therefore, the simplest optical fiber structure is designed by covering the core material having a higher refractive index with the cladding material having a lower refractive index. In this way, the signal light transmitted in the core will be restrained within the cladding due to the total internal reflection.

However, as described above, when the intensity of the signal light transmitted in the optical fiber is naturally declined, the light with the same character is required to serve as the gain after a certain transmission distance so as to keep the intensity of the signal light on a certain standard.

For generating the optical gain, the transition metal element or the rare earth element or the optical non-linear material is doped in the medium to form the optical-gain medium. For example, the transition metal element is one of Cr and Mn. The rare earth element is one selected from a group consisting of Er, Yb and Tm. The optical non-linear material comprises one of Ge and Pb. The doped element usually exists in an ion state. It is obvious that the higher the doping concentration is, the better the effect of the optical gain is. Besides, the refractive index of the medium is relatively enhanced.

Figure 1:
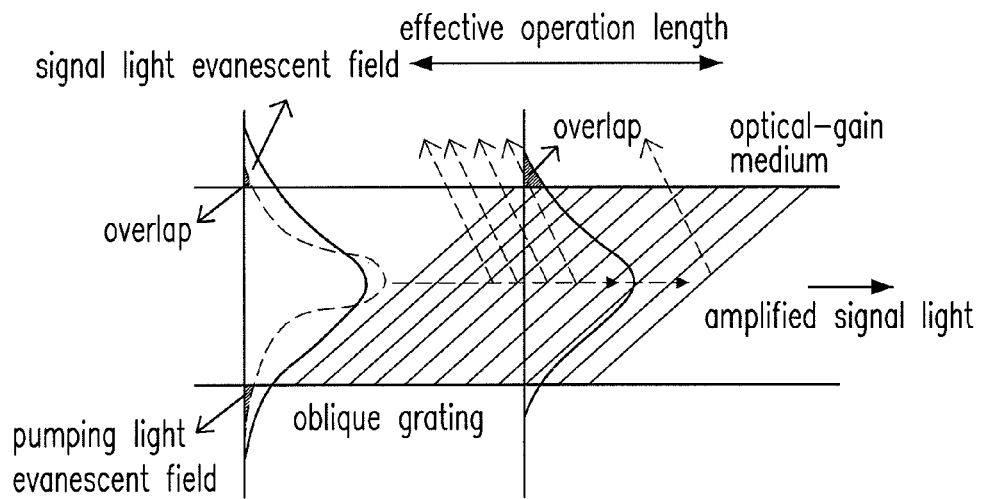
FIG. 1 shows the conventional method where the slant grating is used to reflect the pump light in the optical fiber to the side having the optical-gain medium so as to generate the optical gain.
Figure 2:
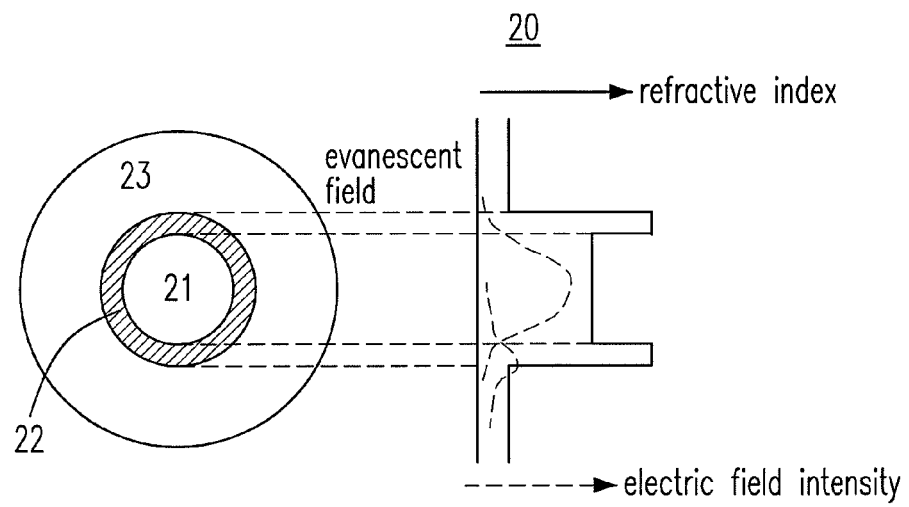
FIG. 2 is a cross-sectional view as well as the index profile of the optical-gain optical fiber according to a preferred embodiment of the present invention.

Please refer to FIG. 2, which is a cross-sectional view of the optical-gain optical fiber according to a preferred embodiment of the present invention. As shown in FIG. 2, the optical-gain optical fiber 20 is composed of a core 21, a first cladding 22 and a second cladding 23. The first cladding 22 covers the core 21. The material of the first cladding 22 includes an optical-gain dopant (not shown), usually a rare earth element (e.g. Er or Yb) or a transition metal element (e.g. Cr or Mn). The doped element usually exists in an ion state and can be used to generate the optical gain. The second cladding 23 covers the first cladding 22. Compared with the core 21 and the first cladding 22, the second cladding 23 has the lowest refractive index. Through the total internal reflection, the second cladding 23 can be used to reflect any light including the optical gain so that the light can be transmitted within the second cladding 23.

Using the above-mentioned optical fiber structure, if the electron in the 4f shell of the optical-gain dopant is in an excitation state and when a single-mode laser light (serve as a signal light) is transmitted in the core 21 (the electric field intensity distribution thereof is shown by the dotted line with a larger wave crest at the right side of FIG. 2), the evanescent field of the signal light exists in the position of the first cladding 22, and the refractive index of the first cladding 22 is larger than that of the core 21. Hence, a small part of the signal light is escaped from the core 21. When the small part of the signal light encounters the interface between the first cladding 22 and the second cladding 23, it is totally reflected and returns to the first cladding 22. The small part of the signal light escaped passes in the first cladding 22, which induces the optical-gain dopant whose electron in the 4f shell is in the excitation state to generate the coherent photon so as to form optical gains. These optical gains are further restrained by the second cladding 23 and reflected back thereto to enter the core 21 or induce more optical gains.

It shall be mentioned that when the thickness of the first cladding 22 is approximate to the wavelength of the signal light, the effect of the optical gains generated in the first cladding 22 being returning to the core 21 is optimal. The optical gains returning to the core 21 become a part of the signal light, which strengthens the intensity of the signal light.

After the signal light passing in the core 21 is continually amplified due to the optical gains, the composition thereof is no longer the original light but a combination of laser lights as well as the broadband amplified spontaneous emission lights. With the long distance transmission, the signal light with a longer wavelength encounters more losses, while the signal light with a shorter wavelength encounters less losses. The mode field distribution of the signal light with a longer wavelength is more widely spread, while the mode field distribution of the signal light with a shorter wavelength is more centralized. When the signal lights with different wavelengths pass in the same core together, compared to the signal light with a shorter wavelength, the signal light with a longer wavelength has a broader range of the evanescent field. That is to say, the portion of the signal light with a longer wavelength that escapes from the core is more than the portion of the signal light with a shorter wavelength that escapes from the core.

Figure 3:
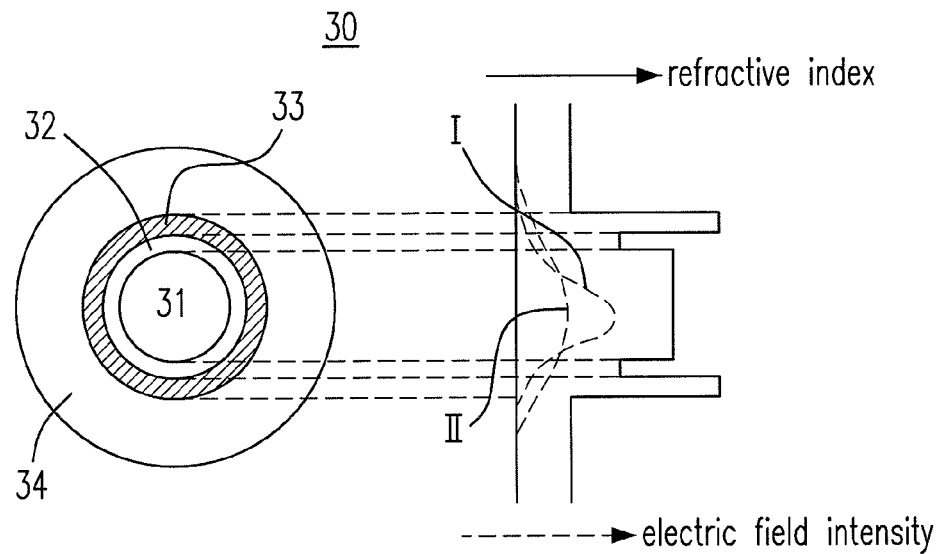
FIG. 3 is a cross-sectional view as well as the index profile of the optical-gain optical fiber according to another preferred embodiment of the present invention.

Please refer to FIG. 3, which is a cross-sectional view of the optical-gain optical fiber according to another preferred embodiment of the present invention. As shown in FIG. 3, the optical-gain optical fiber 30 is composed of a core 31, a first cladding 33, a second cladding 34 and a third cladding 32. The structure of FIG. 3 is similar to that of FIG. 2, wherein the difference lies in the third cladding 32 disposed between the core 31 and the first cladding 33. As shown in FIG. 3, the refractive index of the third cladding 32 is smaller than that of the core 31. Besides, the third cladding 32 has a dispersive dopant (not shown). Preferably, the third cladding 32 has a thickness approximate to the wavelength of the signal light, which makes the total reflection between adjacent interfaces unobvious for some wavelengths.

For better utilizing the differences between the evanescent fields existent due to the wavelength differences between the signal lights, the dispersive dopant included in the third cladding 32 can affect the light dispersion character transmitted therebetween. For example, if the dispersive dopant is boron, the mode field distribution of the signal light is flat, as shown by the dotted line II at the right side of FIG. 3. If the dispersive dopant is fluorine, the mode field distribution of the signal light is more centralized, as shown by the dotted line I at the right side of FIG. 3. Through properly adjusting the dispersive dopant, the guiding wavelength can be selected to be shorter or longer. That is, a shorter or a longer wavelength within the gain bandwidth will enter the first cladding 33 to obtain the optical gain for the required wavelength range.

Figure 4:
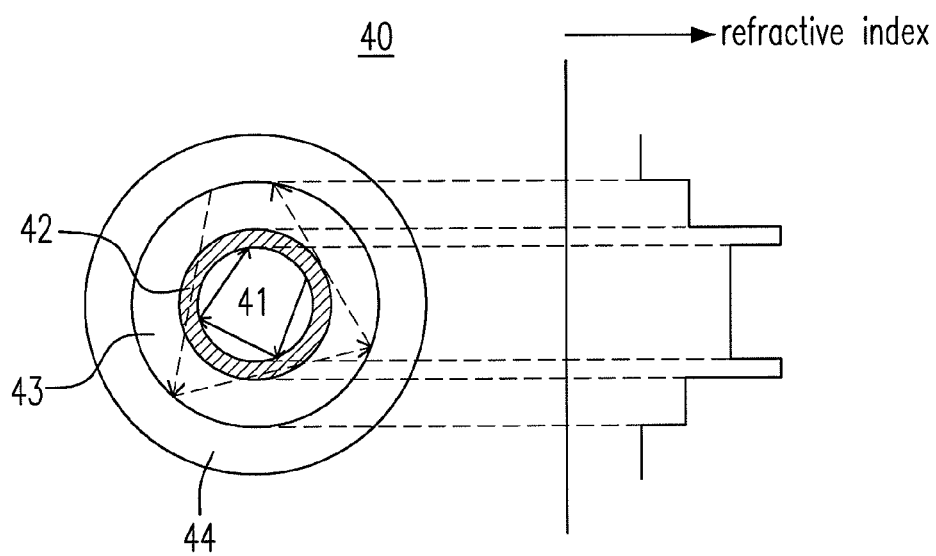
FIG. 4 is a cross-sectional view as well as the index profile of the cladding-pumped optical fiber according to a preferred embodiment of the present invention.

Please refer to FIG. 4, which is a cross-sectional view of the cladding-pumped optical fiber according to a preferred embodiment of the present invention. As shown in FIG. 4, the cladding-pumped optical fiber 40 is composed of a core 41, a first cladding 42, a second cladding 43 and a third cladding 44. The core 41 is used for transmitting a single-mode laser light (serve as a signal light) as shown by the solid-line arrow. The first cladding 42 covers the core 41 and has an optical-gain dopant (not shown). The second cladding 43 covers the first cladding 42 and is used for transmitting a pumping light as shown by the dotted-line arrow. The third cladding 44 covers the second cladding 43 and is used for reflecting the pumping light. As shown in FIG. 4, the refractive index of the first cladding 42 is larger than that of the second cladding 43, and the refractive index of the second cladding 43 is larger than that of the third cladding 44. The ingredient of the optical-gain dopant is the same as that described above, so it is not repeated here.

The pumping light transmitted in the second cladding 43 can be a high power multi-mode laser light or a high power large-mode-field single-mode laser light, which is restrained within the third cladding 44 due to the total reflection. The diameter of the second cladding 43 is typically above 90 micrometers and can be cooperated with the sizes of beams radiated by various kinds of multimode laser diodes in the market. When the pumping light passes through the first cladding 42, the electron in the 4f shell of the optical-gain dopant is excited to the position of an excitation state. Since the structures and materials of the core 41, the first cladding 42 and the second cladding 43 in FIG. 4 are the same as those of the core 21, the first cladding 22 and the second cladding 23 in FIG. 2, the process of utilizing the signal light to form the optical gain so as to increase the intensity of the signal light in the core 41 is similar to that described in FIG. 2, and thus it is not repeated here. The emphasis of this embodiment lies in the use of the high power multimode laser light as the pumping light.

Figure 5:
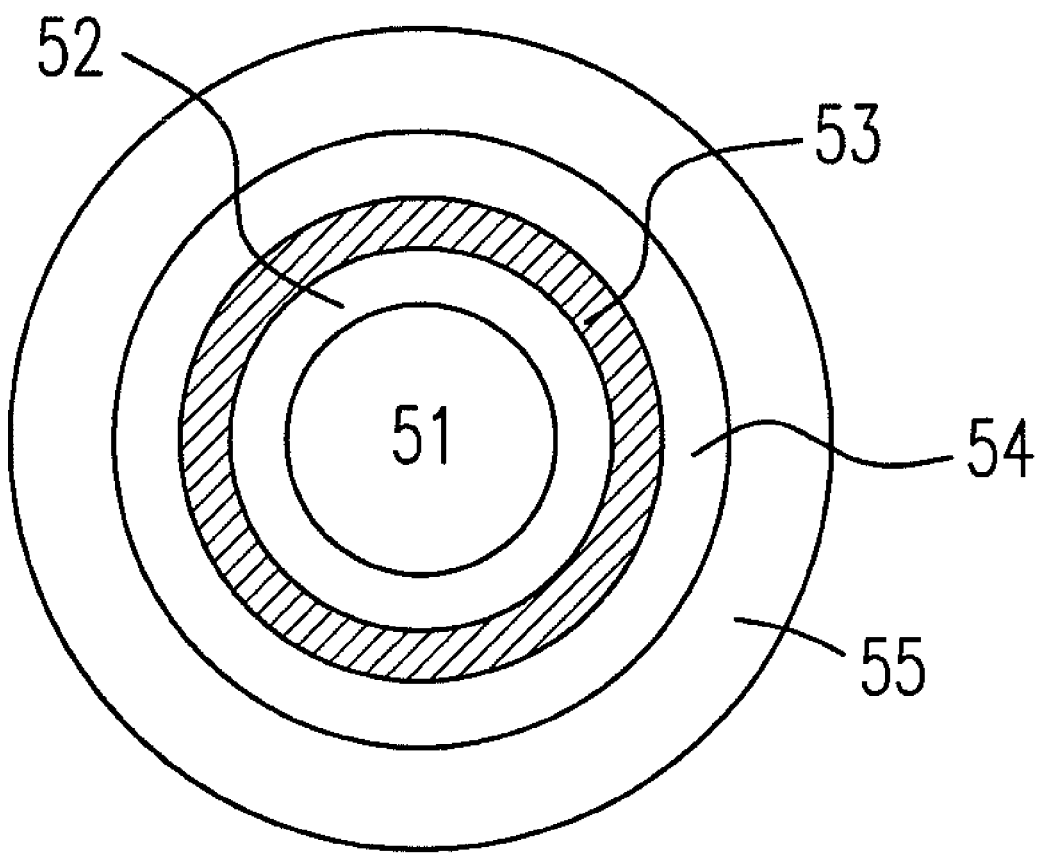
FIG. 5 is a cross-sectional view of the cladding-pumped optical fiber according to another preferred embodiment of the present invention.

As described above, when the thickness of the first cladding 42 is approximate to the wavelength of the signal light, the effect of the optical evanescent gains generated in the first cladding 42 being returning to the core 41 is optimal. Similarly, the pumping light used in this embodiment can also enter the core 41. When the signal light and the pumping light are simultaneously transmitted in the core 41, the pumping light has a shorter wavelength and a narrower range of the mode field distribution. Based on the above, for selectively making the evanescent field of the signal light used for triggering the optical-gain dopant so as to form the coherent photons, a fourth cladding 52 can also be disposed between the core 51 and the first cladding 53, as shown in FIG. 5. The refractive index of the fourth cladding 52 is smaller than that of the core 51. Besides, the fourth cladding 52 has a dispersive dopant. The ingredient and application method of the dispersive dopant are not repeated here.

Figure 6:
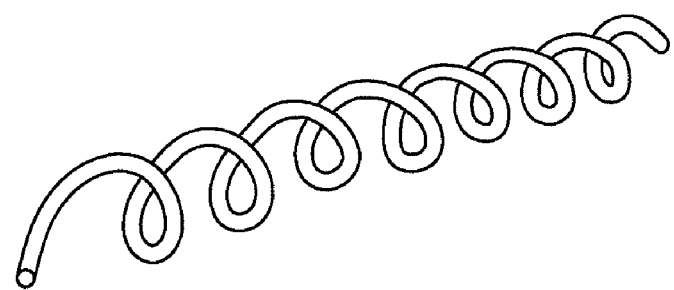
FIG. 6 shows the optical-gain optical fiber with a coiled structure in the present invention.

When the rare earth element or the transition metal element of the optical-gain dopant is in the excitation state, the generation of spontaneous radiation is unavoidable, wherein the electric field intensity distribution thereof is shown by the dotted line with a smaller wave crest at the right side of FIG. 2. If the light of the spontaneous radiation enters the core 21 to become the noise, the signal to noise ratio of the signal light will be reduced. In order to avoid such issue, a feasible way is to manufacture the optical fiber as used in a coiled structure, as shown in FIG. 6. This increases the incident angle of the interface between the first cladding 22 and the second cladding 23, so that most of the undesirable spontaneous radiation can escape from the first cladding 22 via the second cladding 23 whereas the amplified laser light obtaining optical gains through evanescent tail are more likely to be guided to propagate in core 21.

Figure 7:
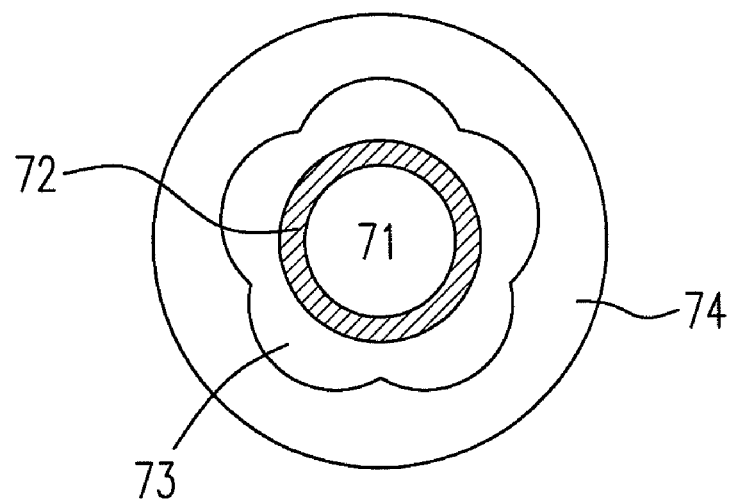
FIG. 7 is a cross-sectional view of the cladding-pumped optical fiber according to a further preferred embodiment of the present invention.

The function of the pumping light is to pass through the inner claddings having the optical-gain dopant back and forth along the transverse direction. However, it can be found from the path of the pumping light as shown by the dotted line in FIG. 4 that if the shape of the inner wall of the outer cladding for reflecting the pumping light is approximate to a circular shape, for the skew pumping light where the incident angle thereof is far greater than the critical angle of the total inner reflection thereof, it is likely to pass along the edge of the inner wall of the outer cladding and are unable to enter the inner cladding. In order to enhance the probability that the pumping light is reflected to pass through the inner cladding, the shape of the inner wall of the outer cladding shall be adjusted as a non-circular shape. For example, the inner wall of the outer cladding can be D-shaped, plum blossom-shaped or polyhedron-shaped. Please refer to FIG. 7, which is a cross-sectional view of the cladding-pumped optical fiber according to a further preferred embodiment of the present invention. The cladding-pumped optical fiber 70 is composed of a core 71, a first cladding 72, a second cladding 73 and a third cladding 74. The basic characters of the core 71 and each cladding are the same as those of the preceding embodiment of FIG. 4. Moreover, the interface between the second cladding 73 and the third cladding 74 is plum blossom-shaped.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cladding-pumped evanescent gain optical fiber, comprising:
    a core transmitting a signal light;
    a first cladding covering the core and having an optical-gain dopant;
    a second cladding covering the first cladding for transmitting a pumping light;
    a third cladding covering the second cladding for reflecting the pumping light; and a fourth cladding disposed between the core and the first cladding, wherein the fourth cladding has a refractive index smaller than that of the core.

2. A cladding-pumped evanescent gain optical fiber as claimed in claim 1, wherein the first cladding has a refractive index larger than that of the second cladding, and the second cladding has a refractive index larger than that of the third cladding.

3. A cladding-pumped evanescent gain optical fiber as claimed in claim 1, wherein the pumping light is a multimode laser light.

4. A cladding-pumped evanescent gain optical fiber as claimed in claim 3, wherein the first cladding has a thickness approximate to a wavelength of the signal light.

5. A cladding-pumped evanescent gain optical fiber as claimed in claim 1, having a coiled structure.

6. A cladding-pumped evanescent gain optical fiber as claimed in claim 1, wherein the optical-gain dopant comprises a rare earth element.

7. A cladding-pumped evanescent gain optical fiber as claimed in claim 6, wherein the rare earth element is one selected from a group consisting of Er, Yb and Tm.

8. A cladding-pumped evanescent gain optical fiber as claimed in claim 1, wherein the optical-gain dopant comprises a transition element.

9. A cladding-pumped evanescent gain optical fiber as claimed in claim 8, wherein the transition element is one of Cr and Mn.

10. A cladding-pumped evanescent gain optical fiber as claimed in claim 1, wherein the optical-gain dopant comprises an optical non-linear material.

11. A cladding-pumped evanescent gain optical fiber as claimed in claim 10, wherein the optical non-linear material comprises one of Ge and Pb.

12. A cladding-pumped evanescent gain optical fiber, comprising:
    a core transmitting a signal light;
    a first cladding covering the core and having an optical-gain dopant;
    a second cladding covering the first cladding for transmitting a pumping light; and
    a third cladding covering the second cladding for reflecting the pumping light, wherein the second cladding and the third cladding have an interface therebetween, which has a non-circular shape.

13. A cladding-pumped evanescent gain optical fiber as claimed in claim 1, wherein the fourth cladding has a dispersive dopant.

14. A cladding-pumped evanescent gain optical fiber as claimed in claim 13, wherein the dispersive dopant comprises one of fluorine and boron.

15. A cladding-pumped evanescent gain optical fiber as claimed in claim 13, wherein the fourth cladding has a thickness approximate to a wavelength of the signal light.

16. An optical-gain optical fiber, comprising:
    a core transmitting a signal light;
    a first cladding covering the core, and having an optical-gain dopant for generating optical gains;
    a second cladding covering the first cladding for reflecting the optical gains; and
    a third cladding disposed between the core and the first cladding, wherein the third cladding has a refractive index smaller than that of the core.

17. An optical-gain optical fiber as claimed in claim 16, wherein the first cladding has a refractive index larger than that of the core, and the core has a refractive index larger than that of the second cladding.

18. An optical-gain optical fiber as claimed in claim 16, wherein the first cladding has a thickness approximate to a wavelength of the signal light.

19. An optical-gain optical fiber as claimed in claim 16, having a coiled structure.

20. An optical-gain optical fiber as claimed in claim 16, wherein the optical-gain dopant comprises a rare earth element.

21. An optical-gain optical fiber as claimed in claim 20, wherein the rare earth element is one selected from a group consisting of Er, Yb and Tm.

22. An optical-gain optical fiber as claimed in claim 16, wherein the optical-gain dopant comprises a transition element.

23. An optical-gain optical fiber as claimed in claim 22, wherein the transition element is one of Cr and Mn.

24. An optical-gain optical fiber as claimed in claim 16, wherein the optical-gain dopant comprises an optical non-linear material.

25. An optical-gain optical fiber as claimed in claim 24, wherein the optical non-linear material comprises one of Ge and Pb.

26. An optical-gain optical fiber as claimed in claim 16, wherein the signal light is a single-mode laser light.

27. An optical-gain optical fiber as claimed in claim 16, wherein the third cladding has a dispersive dopant.

28. An optical-gain optical fiber as claimed in claim 27, wherein the dispersive dopant comprises one of fluorine and boron.

29. An optical-gain optical fiber as claimed in claim 27, wherein the third cladding has a thickness approximate to a wavelength of the signal light.

30. An optical-gain optical fiber as claimed in claim 16, wherein a part of the optical-gain dopant is in an excitation state.

* * * * *